(12) United States Patent (10) Patent No.: US 12,417,544 B2
Varghese et al. (45) Date of Patent: Sep. 16, 2025

(54) METHOD FOR TRAINING A NEURAL NETWORK FOR SEMANTIC IMAGE SEGMENTATION

(71) Applicant: Volkswagen Aktiengesellschaft, Wolfsburg (DE)

(72) Inventors: Serin Varghese, Braunschweig (DE); Fabian Hüger, Wolfenbüttel (DE); Yasin Bayzidi, Braunschweig (DE); Sharat Gujamagadi, Dharwad (IN)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 523 days.

(21) Appl. No.: 17/824,368

(22) Filed: May 25, 2022

(65) Prior Publication Data

US 2022/0383510 A1 Dec. 1, 2022

(51) Int. Cl.
*G06T 7/215* (2017.01)

(52) U.S. Cl.
CPC .... *G06T 7/215* (2017.01); *G06T 2207/10016* (2013.01); *G06T 2207/20081* (2013.01);
(Continued)

(58) Field of Classification Search
CPC ........... G06T 7/215; G06T 2207/10016; G06T 2207/20081; G06T 2207/20084; G06T 2207/30248
(Continued)

(56) References Cited

U.S. PATENT DOCUMENTS

2018/0247194 A1 8/2018 Plebani et al.
2020/0026283 A1 1/2020 Bar et al.
(Continued)

FOREIGN PATENT DOCUMENTS

| DE | 102017130194 A1 | 8/2018 | ............. G06F 17/10 |
| DE | 102018127265 A1 | 5/2019 | ............ H04N 19/132 |
| DE | 102019112595 A1 | 11/2019 | ................ G06T 1/40 |

OTHER PUBLICATIONS

Li, Minghan, et al. "Spatial feature calibration and temporal fusion for effective one-stage video instance segmentation." Proceedings of the IEEE/CVF Conference on Computer Vision and Pattern Recognition. 2021. (Year: 2021).*
(Continued)

*Primary Examiner* — Jonathan S Lee
(74) *Attorney, Agent, or Firm* — Slayden Grubert Beard PLLC (57) ABSTRACT

The present invention relates to a method, a computer program, and an apparatus for training a neural network for semantic image segmentation. The invention further relates to an in-car control unit or a backend system, which make use of such a method or apparatus, and to a vehicle comprising such an in-car control unit. In some embodiments and in a first step, image data of a sequence of image frames are received. Then a frame-based evaluation of semantic segmentation predictions of one or more objects in individual image frames is performed. Furthermore, a sequence-based evaluation of temporal characteristics of semantic segmentation predictions of said one or more objects in at least two image frames is performed. The results of the frame-based evaluation and the sequence-based evaluation are combined.

10 Claims, 3 Drawing Sheets

(52) U.S. Cl.
CPC ............... *G06T 2207/20084* (2013.01); *G06T 2207/30248* (2013.01)

(58) Field of Classification Search
USPC ........................................................ 382/157
See application file for complete search history.

(56) References Cited

U.S. PATENT DOCUMENTS

2020/0327334 A1   10/2020   Goren et al.
2021/0073589 A1   3/2021    Orhon et al.

OTHER PUBLICATIONS

Li, Jiangyun, et al. "Dynamic warping network for semantic video segmentation." Complexity 2021.1 (2021): 6680509. (Year: 2021).*

Zhang, Yunke, et al. "Attention-guided temporally coherent video object matting." Proceedings of the 29th ACM International Conference on Multimedia. 2021. (Year: 2021).*

Ding, Xiangling, et al. "Identification of motion-compensated frame rate up-conversion based on residual signals." IEEE Transactions on Circuits and Systems for Video Technology 28.7 (2017): 1497-1512. (Year: 2017).*

Varghese, Serin et al., "Unsupervised Temporal Consistency Metric for Video Segmentation in Highly-Automated Driving," IEEE/CVF Conference on Computer Vision and Pattern Recognition Workshops (CVPRW), pp. 1369-1378, Jun. 14, 2020.

Liu, Lifan et al., "Efficient Semantic Video Segmentation with Per-Frame Inference," ECCV 2020 Workshop Proceedings, Lecture Notes in Computer Science Book Series, vol. 12535, pp. 352-368, Aug. 23, 2020.

Verghese, Serin et al., "An Unsupervised Temporal Consistency (TC) Loss to Improve the Performance of Semantic Segmentation Networks," IEEE/CVF Conference on Computer Vision and Pattern Recognition Workshops (CVPRW), pp. 12-20, Jun. 1, 2021.

Extended European Search Report, Application No. 21176774.4, 7 pages, Nov. 9, 2021.

* cited by examiner

METHOD FOR TRAINING A NEURAL NETWORK FOR SEMANTIC IMAGE SEGMENTATION

CROSS-REFERENCE TO RELATED APPLICATIONS

This application claims priority to European Patent Application No. EP 21176774.4, filed on May 31, 2021 with the European Patent Office. The contents of the aforesaid Patent Application are incorporated herein for all purposes.

TECHNICAL FIELD

The present invention relates to a method, a computer program, and an apparatus for training a neural network for semantic image segmentation, and for example to improving the stability of neural network-based environment perception predictions for automated driving functions. The invention further relates to an in-car control unit or a backend system, which make use of such a method or apparatus, and to a vehicle comprising such an in-car control unit.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Deep neural networks, in the following abbreviated DNNs, have the potential to out-perform classical computer vision based methods in perception related tasks such as image classification, object detection, and semantic segmentation. Therefore, DNNs have a wide variety of potential applications, including highly automated driving perception systems.

These neural networks are trained on a large and varied dataset. The dataset is varied to ensure generalization of DNNs to varying objects, scenarios and environment conditions. The variation in the dataset includes various domain changes, e.g., for automated driving perception systems different parameters of the vehicle surroundings which influence and distort the data captured by vehicle sensors such as cameras. Examples of such different parameters are different weather conditions such as rain, fog or clear weather or different road conditions in areas in the inner city in contrast to highways.

The DNNs are trained on the selected dataset by optimizing a loss function to minimize the error of the function on the training set. Correspondingly, these DNNs perform well when the target domain is consistent with the training domain. However, studies have shown that DNNs are not robust to variations in the input domain. This has led to training methods with perturbations such as the so-called adversarial training, which is a machine learning technique that attempts to fool models by supplying a deceptive input or the training with additional loss functions.

When using DNNs in real-time applications, however, the inputs are usually image sequences from a camera. This results in additional characteristics of the neural network that have to be evaluated to ensure robust predictions. Not only may it be important for the predictions of the neural network to be accurate, but these predictions should also be stable over time, wherein the term stability denotes that the network predictions are consistent, and do not fluctuate over time.

Especially in applications such as highly automated driving it is imperative that the predictions of the DNNs are stable, and that they do not have large contradicting predictions between two consecutive frames of an input video sequence. A typical example of an unstable prediction that should be avoided in an automated driving perception system is detecting a pedestrian in one frame and not detecting the person in the next frame, although the input is not changing significantly. As becomes apparent from this example, stable predictions may be an important safety criteria for neural network-based environment perception in such applications.

Different approaches are known to improve stability in such cases. In the case of adversarial or augmentation training as a first step changes to the input that negatively affect the performance of the neural network are identified, such as adversarial perturbation, or noise/weather corruptions. In the next step, these images are added to the training set and the neural network is retrained. This allows an extension to stability by training the neural network on sequences where the temporal stability is found to be low. However, this method has a few disadvantages. E.g., there are additional costs due to the necessary labelling of additional images and the increased training time, which is directly proportional to the number of images in the training set.

Likewise, so-called label propagation techniques have been proposed, which use the motion information from image sequences to create additional labels. These additional labels and their corresponding images are added to the training set. After that, the neural network is retrained. However, although label propagation methods allows the neural networks to show improved accuracy due to the increased number of images for training, there is no significant difference in the temporal stability of the networks. Furthermore, similar to adversarial/augmentation training, this comes with a large increase in training time.

SUMMARY

A need exists to provide improved solutions for training a neural network being used for semantic image segmentation.

The need is addressed by the subject matter of the independent claims. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a method for training a neural network for semantic image segmentation comprises:
  receiving image data of a sequence of image frames;
  performing a frame-based evaluation of semantic segmentation predictions of one or more objects in individual image frames;
  performing a sequence-based evaluation of temporal characteristics of semantic segmentation predictions of said one or more objects in at least two image frames; and
  combining the results of the frame-based evaluation and the sequence-based evaluation.

Accordingly and in some embodiments, a computer program comprises instructions, which when executed a computer, cause the computer to perform the following steps for training a neural network for semantic image segmentation:
  receiving image data of a sequence of image frames;
  performing a frame-based evaluation of semantic segmentation predictions of one or more objects in individual image frames;
  performing a sequence-based evaluation of temporal characteristics of semantic segmentation predictions of said one or more objects in at least two image frames; and
  combining the results of the frame-based evaluation and the sequence-based evaluation.

The term computer is understood broadly. For example, it also includes workstations, distributed system, embedded devices, and other processor-based data processing devices, processors, processing circuits, without limitation.

The computer program may, for example, be made available for electronic retrieval or stored on a computer-readable storage medium.

In some embodiments, an apparatus for training a neural network for semantic image segmentation comprises:
  an input configured to receive image data of two sequential image frames;
  means for performing a frame-based evaluation of semantic segmentation predictions of one or more objects in individual image frames;
  means for performing a sequence-based evaluation of temporal characteristics of semantic segmentation predictions of said one or more objects in at least two image frames; and
  means for combining the results of the frame-based evaluation and the sequence-based evaluation.

The solution of the teachings herein provides an object-based training scheme for video sequences, which allows to jointly optimize both the accuracy of semantic segmentation predictions and its temporal consistency. Furthermore, the present solution may run in real-time in parallel to existing perception modules to detect unstable situations. This is particularly helpful for safety-critical applications such as highly automated driving.

In some embodiments, performing the sequence-based evaluation comprises determining semantic segmentation predictions for said one or more objects in each of at least two sequential image frames; estimating displacements between the one or more objects in at least two sequential image frames; applying the estimated displacements to the semantic segmentation prediction of said one or more objects in a first of the at least two sequential image frames to generate an expected semantic segmentation prediction of said one or more objects in a second of the two sequential image frames; and evaluating the semantic segmentation prediction of the one or more objects in the second of the two sequential image frames based on the expected semantic segmentation prediction for the one or more objects in the second of the two sequential image frames.

In some embodiments, a temporal consistency loss is determined for evaluating the semantic segmentation prediction.

In some embodiments, performing a frame-based evaluation of semantic segmentation predictions of one or more objects in individual image frames comprises determining semantic segmentation predictions for one of the two sequential image frames; and determining a cross-entropy loss for the semantic segmentation predictions for said one of the two sequential image frames.

In some embodiments, a total loss is determined by combining the results of the frame-based evaluation and the sequence-based evaluation.

In some embodiments, the total loss is a weighted sum of the cross-entropy loss and the temporal consistency loss.

In some embodiments, the total loss is given by $J_t^{total} = (1-\alpha)J_t^{CE} + \alpha J_t^{TC}$, where $J_t^{total}$ corresponds to the total loss, parameter $\alpha$ is the loss weight that controls the influence of the individual losses, $J_t^{CE}$ is the cross-entropy loss and $J_t^{TC}$ is the temporal consistency loss.

In some embodiments, the loss weight parameter $\alpha$ is variable and may be adapted to address the trade-off between the sequence-based evaluation and the frame-based evaluation.

Beneficially, an in-car control unit may comprise an apparatus according to the teachings herein or may be configured to perform a method according to the teachings herein. Such a system may for example be used in a vehicle, particularly an autonomous or semi-autonomous vehicle. The vehicle may be any type of vehicle, e.g., a car, a bus, a motorcycle, a commercial vehicle, for example a truck, an agricultural machinery, a construction machinery, a rail vehicle, etc. More generally, the teachings herein may be used in land vehicles, rail vehicles, watercrafts, and aircrafts.

Furthermore, a backend system may comprise an apparatus according to the teachings herein or may be configured to perform a method according to the teachings herein.

Further features of the present invention will become apparent from the following description and the appended claims in conjunction with the FIGS.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the FIGS. may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that perform that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that may provide those functionalities are equivalent to those shown herein.

Figure 1:
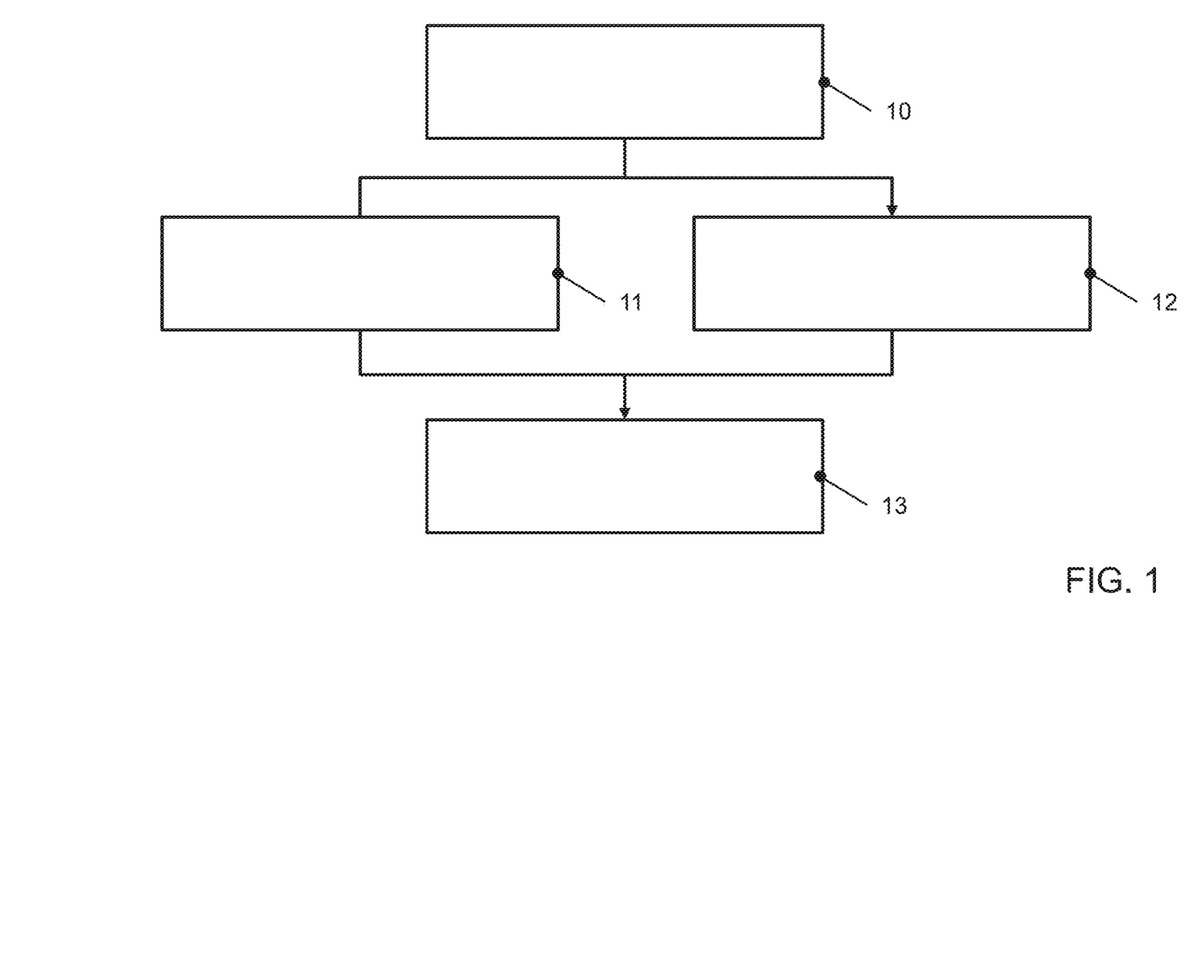
FIG. 1 schematically illustrates a method for training a neural network for semantic image segmentation according to some embodiments.

FIG. 1 schematically illustrates a method for training a neural network based on an object-based training scheme for image sequences. For example, the images of the image sequence may correspond to images of a video sequence captured by a video camera. However, the images may also correspond to consecutive images of a LiDAR sensor, which uses ultraviolet, visible, or near infrared light to image objects or to images provided by another image-generating sensor.

Initially, the image data are received in a first step 10 of the method. For example, sequential image frames of a video sequence captured by a camera may be provided to the further steps of the inventive method, possibly after a video preprocessing to get rid of artifacts, suppress noise etc. Different kinds of cameras may be used for capturing the video sequence, such as 2D or 3D cameras or cameras using different parts of the light spectrum, as long as the frame rate of the used camera is sufficiently high. For a sufficiently high frame rate, there is only a continuous and therefore limited movement of objects across frames. Therefore, it is highly unlikely for objects to be present in one frame, then be absent in the next frame, and then abruptly be present again in the next.

The captured and possibly preprocessed image frames may be directly provided to the further steps in case of real-time processing, for example, when the method is implemented in a perception module of a vehicle with automated driving functions. However, in an offline mode the captured image frames may also by stored in a database and later on retrieved from this database for the inventive processing of the data.

In step 11, a frame-based evaluation of semantic segmentation predictions of one or more objects in individual image frames is performed. This is done as a supervised training which involves a loss function that penalizes incorrect predictions of the network when compared with ground truth labels. For a labelled data set of image frames semantic segmentation predictions are determined for the individual image frames and the semantic segmentation network is optimized using a cross-entropy (CE) loss.

In step 12, a sequence-based evaluation of temporal characteristics of semantic segmentation predictions of objects in at least two image frames is performed. For this purpose, semantic segmentation predictions are determined for two consecutive sequential image frames. Displacements between the image data of the two sequential image frames are estimated. For this purpose, optical flow approaches may be used to accurately model the movement of the objects between the two image frames. This maps both, the movement of the objects in the video and the movement of the camera.

The estimated displacements are applied to the semantic segmentation prediction of the first of the two sequential image frames to generate an expected semantic segmentation prediction for the second of the two sequential image frames. The semantic segmentation prediction of the second of the two sequential image frames is evaluated based on the expected semantic segmentation prediction for the second of the two sequential image frames. For example, the temporal consistency TC of the semantic segmentation prediction is calculated, which may be used as an optimization objective to improve the stability of the segmentation predictions. Temporally consistent, or in other words stable, predictions of semantic segmentation networks means here that movement of detected objects is limited.

Finally, in step 14, the results of the frame-based evaluation and the sequence-based evaluation are combined.

In the following, details and the theoretical background of the inventive method are described in more detail.

Supervised Semantic Segmentation Training:

As mentioned above, the supervised semantic segmentation training involves a loss function that penalizes the incorrect predictions of the network when compared with ground truth labels. This supervised training may be necessary for ensuring the accuracy of the semantic segmentation is maintained in the second step of the training process. The segmentation mask $m_t = (m_{t,i}) \in S^{H \times W}$ of the network prediction at time t consists of elements $$m_{\{t,i\}} = \operatorname*{argmax}_{s \in S} y_{t,i,s},$$

where a class $s \in S$ is assigned to each pixel i in the class score $y_t$. Let $\overline{m}_{t,i} \in S^{H \times W}$ be the labelled ground truth in the dataset $\overline{M}$ corresponding to image $x_t$, having the same dimensions as the segmentation mask $m_t$. Likewise, $\overline{y}_t \in \{0,1\}^{H \times W \times S}$ is the one-hot encoded vector ground truth in three-dimensional tensor format. For supervised training, the network is optimized using the cross-entropy (CE) loss between the posterior probabilities of the network $y_t$ and the labels $\overline{y}_t$. Taking the mean over all pixels, the loss function for the image's posterior probabilities $y_{t,i,s} \in \mathbb{I}$ is defined as $$J_t^{CE} = -\frac{1}{|I|} \sum_{i \in I} \sum_{s \in S} w_s \bar{y}_{t,i,s} \cdot \log(y_{t,i,s})$$

where $|I|=H \cdot W$ is the number of pixels, and $w_s$ are the weights assigned to each class during training.

Unsupervised Temporal Consistency (TC) Loss:

A sequential and unlabeled dataset $\tilde{X}$ with video sequences $\tilde{x}_1^T = (\tilde{x}_1, \tilde{x}_2, \ldots, \tilde{x}_t, \ldots, \tilde{x}_T)$ containing image frames $\tilde{x}_t$ at discrete time instants $t \in T=\{1, 2, \ldots, T\}$ is defined. Optical flow functions are used to capture the notion of network prediction stability, and to estimate the apparent motion within the video sequence. Optical flow estimates the displacement of each pixel between the consecutive frames $\tilde{x}_{t-1}$ and $\tilde{x}_t$. The optical flow computed between $\tilde{x}_{t-1}$ and $\tilde{x}_t$ is defined as a tensor $u_{t-1 \to t} \in U^{H \times W}$, where $U$ is the set of two-dimensional pixel-wise displacements $\Delta/h, \Delta w \in \mathbb{R}$, representing the coordinate-wise shift of each pixel from $\tilde{x}_{t-1}$ to $\tilde{x}_t$.

Using the optical flow tensor $u_{t-1 \to t}$ generated by the optical flow block the prediction of the semantic segmentation network $\tilde{y}_{t-1}$ is warped from time $t-1$ to time $t$. To do this, pixel coordinates for an image are defined as tensor $p \in p^{H \times W}$, where $P=(h,w)$ is an index pair with $h \in \{1, \ldots, H\}$ and $w \in \{1, \ldots, W\}$. Tensor $p$ thus only contains the pixel-wise coordinates of a pixel in an image and does not carry any information about pixel intensity values.

The pixel-wise displacement vectors $u_{t-1 \to t}$ may be added to the original pixel positions $p_{t-1}$ to receive a tensor $$p_{t-1 \to t} = p_{t-1} + u_{t-1 \to t}$$

which provides the projected pixel coordinates $p_{t-1 \to t} \in U^{H \times W}$ Subsequently, the segmentation output $\tilde{y}_{t-1}$ is shifted to pixel positions $p_{t-1 \to t}$. As the pixel coordinates $p_{t-1 \to t}$ are non-integer numbers, nearest neighbour sampling nearest( ) may be used to obtain valid integer coordinates in a grid-like structure as in $p_t$. That is, for the mapping $\tilde{y}_{t-1}$ of to the flow-based estimate $\tilde{y}_{t-1 \to t}$ is obtained as $$\tilde{y}_{t-1 \to t} = \text{nearest}(\tilde{y}_{t-1}, p_{t-1 \to t})$$

Accordingly, $\tilde{y}_{t-1 \to t}$ is the expected prediction at time $t$ based on the optical flow, conditioned on the change in the pair of inputs $\tilde{x}_{t-1}$ and $\tilde{x}_t$, which compensates for the movement of the camera and the objects in the consecutive frames. Ideally, for a good semantic segmentation model, the distance between the network output $\tilde{y}_t$ and the prediction based on the optical flow $\tilde{y}_{t-1 \to t}$ should be small. To enforce this, the temporal consistency metric interpretation described in S. Varghese et al. in "Unsupervised Temporal Consistency Metric for Video Segmentation in Highly-Automated Driving", Proc. of CVPR—Workshops, pp. 336-337, Seattle, WA, USA, June 2020, is applied, defining temporal consistency as the mean intersection-over-union (mIoU) of the two predictions $\tilde{y}_t$ and $\tilde{y}_{t-1 \to t}$.

As per definition, the mIoU between the segmentation masks $\tilde{m}_t$ and $\tilde{m}_{t-1 \to t}$ is given as $$mIoU(\tilde{m}_{t-1 \to t}, \tilde{m}_t) = \frac{1}{S} \sum_{s \in S} \frac{TP_{s,t}}{TP_{s,t} + FP_{s,t} + FN_{s,t}}$$

where $TP_{s,t}$, $FP_{s,t}$ and $FN_{s,t}$ are the class-specific true positives, false positives and false negatives, respectively, which are calculated for $\tilde{m}_t$, considering $\tilde{m}_{t-1 \to t}$ as reference.

A value of MIoU $(\tilde{m}_{t-1 \to t}, \tilde{m}_t)=1$ indicates that both overlap perfectly and the prediction of the network is completely stable. However, the mIoU metric cannot be optimized by gradient descent as set operations are non-differentiable. To be able to still use this as part of a loss function, the mIoU is approximated to ensure differentiability for gradient descent. An approximation of the mIoU is made using class probabilities $\tilde{y}_{t-1 \to t}$ and $\tilde{y}_t$ and this approximation is given by $$\widetilde{mIoU}_t = \frac{1}{S} \sum_{s \in S} \frac{\sum_{i \in I} |y'_{t,s,i} \cdot \tilde{y}_{t,s,i}|}{\sum_{i \in I} |y'_{t,s,i} + \tilde{y}_{t,s,i} - (y'_{t,s,i} \cdot \tilde{y}_{t,s,i})|}$$

where $y_{t,s,i}'$ and $\tilde{y}_{t-1 \to t,s,i}$ and $\widetilde{mIoU}_t = \widetilde{mIoU}_t(\tilde{y}_{t-1 \to t}, \tilde{y}_t)$.

The vector $\widetilde{mIoU}_t = \{\widetilde{mIoU}_{t,0}, \widetilde{mIoU}_{t,1}, \ldots, \widetilde{mIoU}_{t,s}\}$ contains the class-wise stability of the predictions of the semantic segmentation network. This may be envisioned as connected components of the same semantic class that is being compared amongst each other. This loss therefore enforces the temporal stability based on individual classes or objects rather than focus on the pixel level which ignores this class-based dependency.

The temporal consistency (TC) loss between the prediction at time $t$ and the warped prediction from time $t-1$ is then defined as $$J_t^{TC} = 1 - \widetilde{mIoU}_t$$

Note that since $\widetilde{mIoU}_t$ is larger for stable predictions, the loss may need to be minimized.

The temporal consistency loss $J_t^{TC}$ therefore enforces the stability of the predictions of a semantic segmentation model by motion flow calculations, given sequential images in a self-supervised manner, i.e., without requiring labels.

Finally, the cross-entropy loss and the temporal consistency loss are combined as $$J_t^{total} = (1-\alpha)J_t^{CE} + \alpha J_t^{TC}$$

where $\alpha$ is the loss weight that controls the influence of the individual losses, and $J_t^{CE}$ is computed on dataset X, while $J_t^{TC}$ is computed on dataset $\tilde{X}$. A loss weight $\alpha=0$ indicates that only $J_t^{CE}$ is used and $\alpha=1$ indicates that only $J_t^{TC}$ is used.

In this way, a total loss $J_t^{total}$ is determined for a second-stage training, i.e., a fine-tuning process for the training of the neural network.

Figure 2:
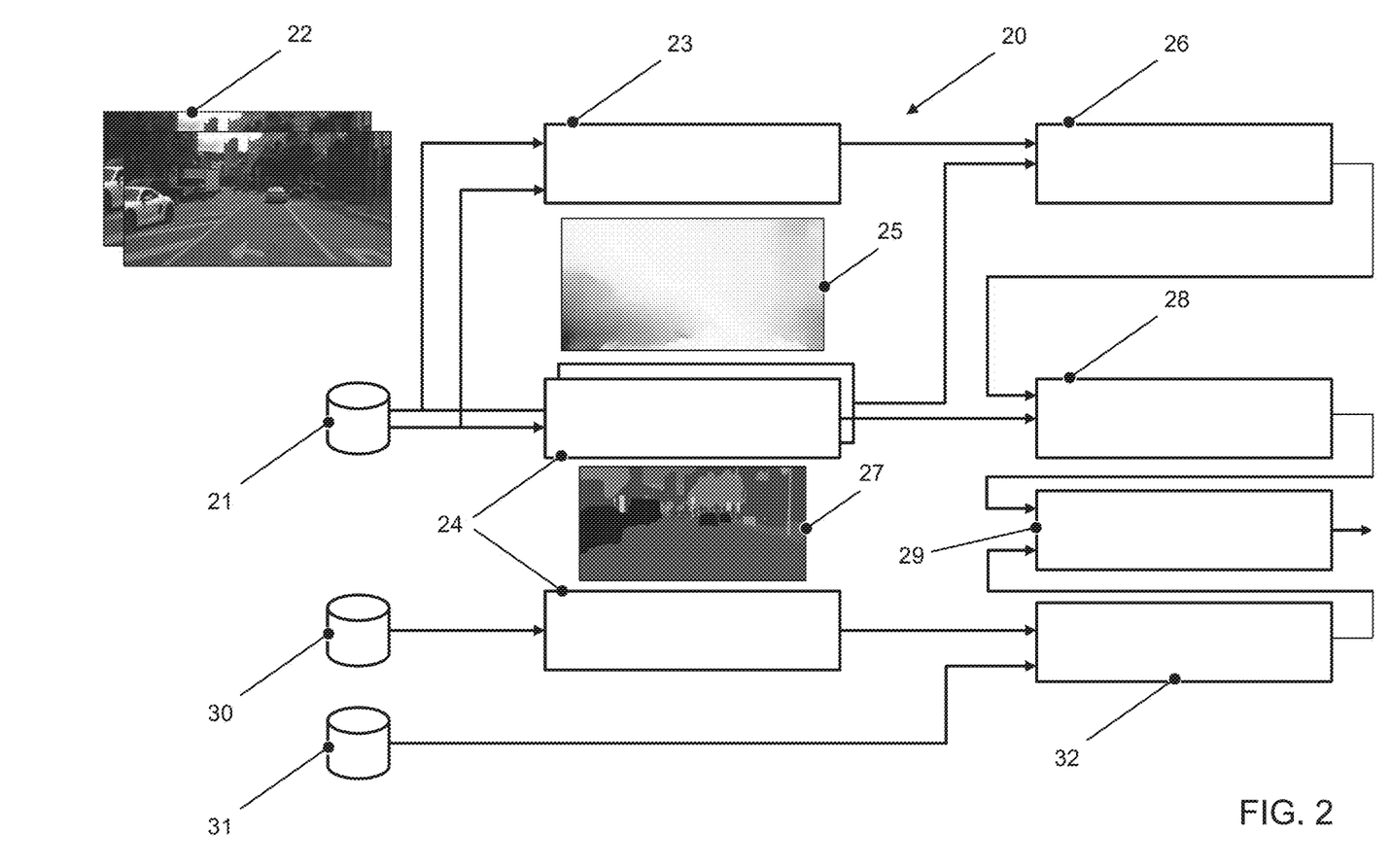
FIG. 2 schematically illustrates a block diagram of an apparatus according to some embodiments which implements a training strategy.

FIG. 2 schematically illustrates a block diagram of an apparatus 20, which implements the inventive training strategy for enforcing temporal consistency in a self-supervised fashion for a semantic segmentation network. The separate modules shown in the FIG. may be controlled by a not depicted controller and may be embodied as dedicated hardware units. Of course, they may likewise be fully or partially combined into a single unit or implemented as software running on a processor, e.g. a CPU or a GPU.

A data source 21 comprises a sequential and unlabeled dataset with video sequences containing image frames. For example, the image frames could have been generated by a not shown video camera, which captures for a road scene a video sequence of image frames. The data source could be part of a local database.

For calculating the temporal consistency (TC) loss a pair of sequential image frames 22 corresponding to discrete time instants $t-1$ and $t$, respectively, are provided from the data source 21. More in detail, both image frames are fed to an optical flow module 23 and to a semantic segmentation module 24. The optical flow module 23 computes the optical flow 25 between the pair of sequential image frames 22 corresponding to the displacement of object pixels in these image frames and provides a calculated optical flow tensor to the subsequent prediction warping module 26.

In semantic segmentation module 24, semantic segmentation predictions are determined for the two sequential image frames. From the semantic segmentation module 24 the semantic segmentation prediction 27 of the first image frame at time instant t−1 is fed to the prediction warping module 26 while the semantic segmentation prediction of the second image frame at time instant t is fed to the temporal consistency (TC) loss module 28.

In the prediction warping module 26 the optical flow tensor calculated between the two sequential image frames is used to warp the prediction of the semantic segmentation from time t−1 to time t, resulting in an expected segmentation output, which is also fed to the temporal consistency (TC) loss module 28. In the temporal consistency (TC) loss module 28 the temporal consistency (TC) loss between the prediction at time t and the warped prediction from time t−1 is then calculated, and, if desired, averaged for all pairs of consecutive images in the considered video sequence to obtain a value for the mean temporal consistency. The calculated temporal consistency (TC) loss is provided to the total loss module 29 and then used in the training process together with the cross-entropy loss.

The cross-entropy loss is determined in a supervised training process. Image frames and ground truth labels for these image frames are provided from data sources 30 and 31, respectively. Data sources 30 and 31, and also data source 21, could be separate or integrated, for example into a single database.

In semantic segmentation module 24, the semantic segmentation prediction is performed for an image frame, which is fed to a cross entropy loss module 32. In cross entropy loss module 32 the semantic segmentation predictions are compared with the ground truth labels, which allows to optimize the network using a cross-entropy (CE) loss function that penalizes the incorrect predictions of the network when compared with ground truth labels. The cross-entropy (CE) loss is then also provided to the total loss module 29 and combined with the temporal consistency loss to determine the total loss.

Figure 3:
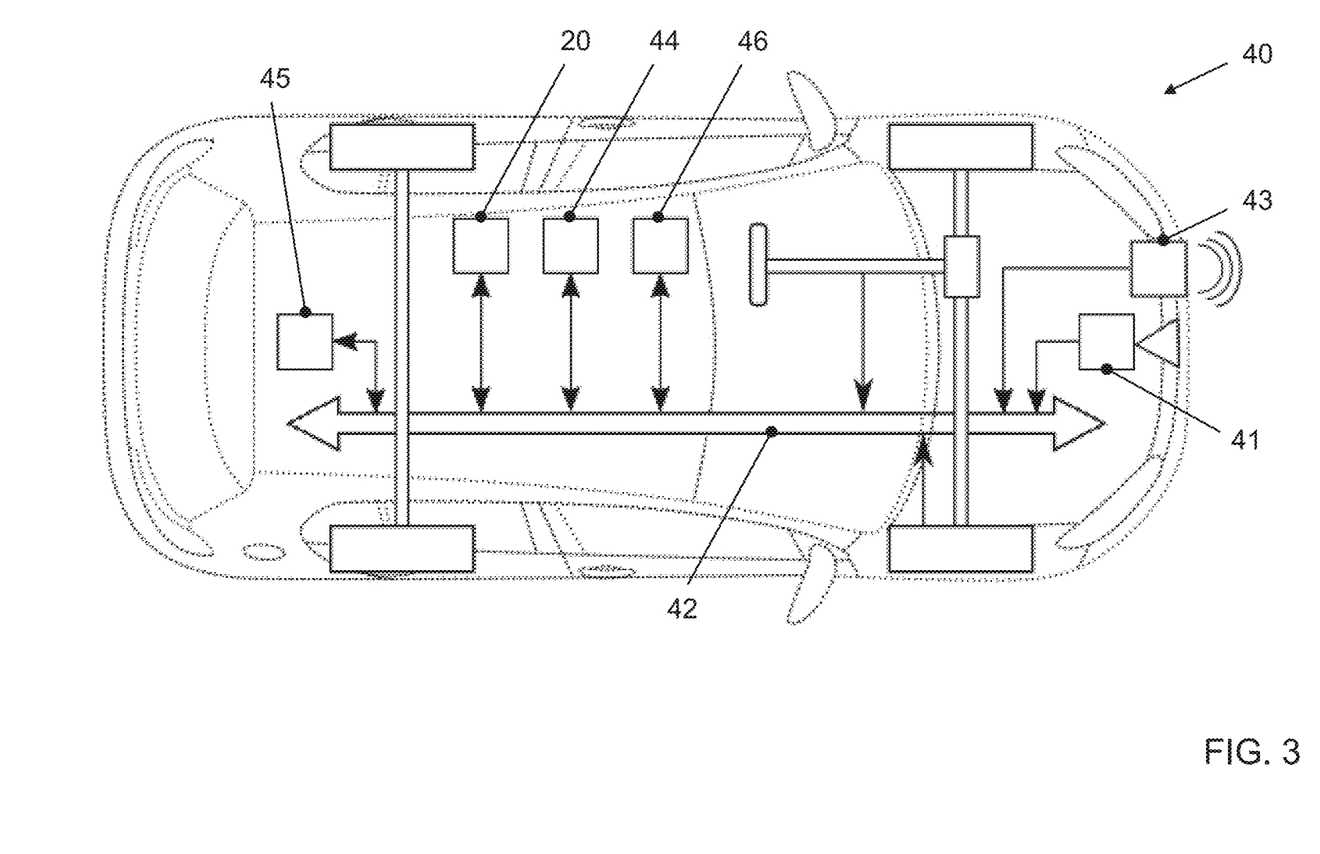
FIG. 3 schematically illustrates a block diagram of a vehicle according to some embodiments.

FIG. 3 schematically shows a top view of a vehicle 40 in which automated driving or driver assistance functions may use the trained semantic image segmentation network in a perception system of a so-called observer. The vehicle 40 may for example be a passenger car or a truck.

The vehicle comprises an apparatus 20 for training the semantic image segmentation network as described above, which may be designed, for example, as a control unit of the vehicle 40 and may have one or more microcontrollers or microprocessors.

In addition, the vehicle comprises at least one vehicle camera 41, which captures the vehicle surroundings of the vehicle, e.g. a front camera, a rear camera and/or side cameras. The image or video data generated by the one or more vehicle cameras are fed via a digital data bus 42 in the vehicle to the apparatus 20, which processes the image data of the image frames as described above.

Furthermore, the vehicle may also have at least one further sensor 43 such as a Radar or LiDAR sensor, which allows to detect the vehicle surroundings and to determine the distance between the vehicle and objects in the vehicle surroundings. For localizing the vehicle, a navigation unit 44 may receive GPS signals and, possibly, also analyze high-precision map data and sensor-supported detection of landmarks in the vehicle's surroundings.

In the vehicle 40, a perception module 45 is also provided which detects, classifies and tracks objects in the vehicle surrounding based on the obtained segmentation data, sensor data and position data and provides the object information to an assistance unit 46.

Assistance unit 46 provides, based on this information and other data and parameter of the vehicle such as the current position, speed and acceleration of the vehicle, assistance functions such as automatic longitudinal and lateral guidance of the vehicle.

Furthermore, data about current weather or weather conditions may also be taken into account, which may be recorded by suitable sensors in the vehicle or may also be supplied to the vehicle externally. For example, the current outside temperature may be determined with an outside temperature sensor in the vehicle, while data on the current wind conditions are received via a mobile data radio link.

In addition, the vehicle may have further components, not shown in FIG. 3. For example, the vehicle may also be equipped with an on-board connectivity module, which may be used for mobile communication with a backend server for exchanging data.

LIST OF REFERENCE NUMERALS

10 Receiving image data of two sequential image frames
11 Performing frame-based evaluation of semantic segmentation predictions
12 Performing sequence-based evaluation of temporal characteristics of semantic segmentation predictions
13 Combining results of frame-based evaluation and sequence-based evaluation
20 Apparatus
21 Data source
22 Sequential image frames
23 Optical flow module
24 Semantic segmentation module
25 Optical flow
26 Prediction warping module
27 Semantic segmentation prediction
28 Temporal consistency loss module
29 Total loss module
30, 31 Data source
32 Cross entropy loss module
40 Vehicle
41 Camera
42 Digital data bus
43 Further sensor
44 Navigation unit
45 Perception module
46 Assistance unit The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "for example" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for training a neural network for semantic image segmentation, comprising:
   receiving image data of a sequence of image frames;
   performing a frame-based evaluation of semantic segmentation predictions of one or more objects in individual image frames, wherein a cross-entropy loss is determined;
   performing a sequence-based evaluation of temporal characteristics of semantic segmentation predictions of said one or more objects in at least two image frames, wherein a temporal consistency loss is determined; and
   combining the results of the frame-based evaluation and the sequence-based evaluation to determine a total loss, wherein the total loss is given by $$J_t^{total} = (1-\alpha)J_t^{CE} + \alpha J_t^{TC}$$

where $J_t^{total}$ corresponds to the total loss, $J_t^{CE}$ is the cross-entropy loss, and $J_t^{TC}$ is the temporal consistency loss and wherein loss weight parameter $\alpha$ is variable and may be adapted to address a trade-off between the sequence-based evaluation and the frame-based evaluation.

2. The method of claim 1, wherein performing the sequence-based evaluation comprises:
   determining semantic segmentation predictions for said one or more objects in each of at least two sequential image frames;
   estimating displacements between the one or more objects in at least two sequential image frames;
   applying the estimated displacements to the semantic segmentation prediction of said one or more objects in a first of the at least two sequential image frames to generate an expected semantic segmentation prediction of said one or more objects in a second of the two sequential image frames; and
   evaluating the semantic segmentation prediction of the one or more objects in the second of the two sequential image frames based on the expected semantic segmentation prediction for the one or more objects in the second of the two sequential image frames.

3. The method of claim 2, wherein performing a frame-based evaluation of semantic segmentation predictions of one or more objects in individual image frames comprises:
   determining semantic segmentation predictions for one of the two sequential image frames; and
   determining a cross-entropy loss for the semantic segmentation predictions for said one of the two sequential image frames.

4. A non-transitory storage medium comprising computer program instructions which, when executed by a computer, cause the computer to perform:
   receiving image data of a sequence of image frames;
   performing a frame-based evaluation of semantic segmentation predictions of one or more objects in individual image frames, wherein a cross-entropy loss is determined;
   performing a sequence-based evaluation of temporal characteristics of semantic segmentation predictions of said one or more objects in at least two image frames, wherein a temporal consistency loss is determined; and
   combining the results of the frame-based evaluation and the sequence-based evaluation to determine a total loss, wherein the total loss is given by $$J_t^{total} = (1-\alpha)J_t^{CE} + \alpha J_t^{TC}$$

where $J_t^{total}$ corresponds to the total loss, $J_t^{CE}$ is the cross-entropy loss, and $J_t^{TC}$ is the temporal consistency loss and wherein loss weight parameter $\alpha$ is variable and may be adapted to address a trade-off between the sequence-based evaluation and the frame-based evaluation.

5. An apparatus for training a neural network for semantic image segmentation, the apparatus comprising:
   an input configured to receive image data of two sequential image frames;
   means for performing a frame-based evaluation of semantic segmentation predictions of one or more objects in individual image frames, wherein a cross-entropy loss is determined;
   means for performing a sequence-based evaluation of temporal characteristics of semantic segmentation predictions of said one or more objects in at least two image frames, wherein a temporal consistency loss is determined; and
   means for combining the results of the frame-based evaluation and the sequence-based evaluation to determine a total loss, wherein the total loss is given by $$J_t^{total} = (1-\alpha)J_t^{CE} + \alpha J_t^{TC}$$

where $J_t^{total}$ corresponds to the total loss, $J_t^{CE}$ is the cross-entropy loss and $J_t^{TC}$ is the temporal consistency loss and wherein loss weight parameter $\alpha$ is variable and may be adapted to address a trade-off between the sequence-based evaluation and the frame-based evaluation.

6. The apparatus of claim 5, wherein the means for performing the sequence-based evaluation comprises:
   a semantic segmentation module for determining semantic segmentation predictions for said one or more objects in each of at least two sequential image frames;
   an optical flow module for estimating displacements between the one or more objects in at least two sequential image frames;
   a prediction warping module for applying the estimated displacements to the semantic segmentation prediction of said one or more objects in a first of the at least two sequential image frames to generate an expected semantic segmentation prediction of said one or more objects in a second of the two sequential image frames; and
   a temporal consistency loss module for evaluating the semantic segmentation prediction of the one or more objects in the second of the two sequential image frames based on the expected semantic segmentation prediction for the one or more objects in the second of the two sequential image frames.

7. An in-car controller, wherein the in-car controller comprises the apparatus of claim 5.

8. A vehicle, wherein the vehicle comprises the in-car control unit of claim 7.

9. A backend system, wherein the backend system comprises the apparatus of claim 5.

10. The apparatus of claim 6, wherein the means for performing a frame-based evaluation of semantic segmentation predictions of one or more objects in individual image frames comprises:

a semantic segmentation module for determining semantic segmentation predictions for one of the two sequential image frames; and
a cross entropy loss module for determining a cross-entropy loss for the semantic segmentation predictions for said one of the two sequential image frames.

* * * * *